(12) United States Patent
Panchapakesan et al.

(10) Patent No.: US 11,189,291 B2
(45) Date of Patent: Nov. 30, 2021

(54) STAGED USER ENROLLMENT USING AUDIO DEVICES

(71) Applicant: VMware, Inc., Palo Alto, CA (US)

(72) Inventors: Ramani Panchapakesan, Bangalore (IN); Ramanandan Nambannor Kunnath, Bangalore (IN); Neelima Bojja, Bangalore (IN); Kara Madhavan Bhattathiri, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 205 days.

(21) Appl. No.: 16/518,441

(22) Filed: Jul. 22, 2019

(65) Prior Publication Data

US 2021/0027787 A1 Jan. 28, 2021

(51) Int. Cl.
*G10L 15/30* (2013.01)
*G10L 15/22* (2006.01)
*H04L 9/08* (2006.01)

(52) U.S. Cl.
CPC .............. *G10L 15/30* (2013.01); *G10L 15/22* (2013.01); *H04L 9/088* (2013.01)

(58) Field of Classification Search
USPC ...................................................... 704/1–504
See application file for complete search history.

(56) References Cited

U.S. PATENT DOCUMENTS

| | | | | |
|---|---|---|---|---|
| 6,122,403 A * | 9/2000 | Rhoads | ................ | G06Q 20/341 382/233 |
| 6,853,716 B1 * | 2/2005 | Shaffer | ................... | H04M 3/56 370/260 |
| 2003/0031341 A1 * | 2/2003 | Rhoads | ................ | G07D 7/0032 382/100 |
| 2003/0086585 A1 * | 5/2003 | Rhoads | ................ | G06Q 20/341 382/100 |
| 2005/0196013 A1 * | 9/2005 | Rhoads | .............. | H04N 1/32144 382/100 |
| 2006/0188128 A1 * | 8/2006 | Rhoads | .................. | G06K 19/18 382/100 |
| 2008/0228472 A1 * | 9/2008 | Park | ....................... | G10L 19/167 704/211 |
| 2010/0094639 A1 * | 4/2010 | Rhoads | .............. | H04N 1/32144 704/500 |
| 2014/0095894 A1 * | 4/2014 | Barton | .................. | H04W 12/08 713/190 |
| 2019/0122698 A1 * | 4/2019 | Iyer | ........................ | H04H 20/31 |
| 2021/0027787 A1 * | 1/2021 | Panchapakesan | ....... | G10L 15/30 |

* cited by examiner

*Primary Examiner* — Marcus T Riley
(74) *Attorney, Agent, or Firm* — Thomas | Horstemeyer LLP

(57) ABSTRACT

Disclosed are various embodiments for staged user enrollment using audio devices. In one embodiment, among others, a system includes a computing device and program instructions. The program instructions can cause the computing device to receive a configuration profile for configuring a client device. The configuration profile includes a device policy associated with an organizational group. The program instructions can further cause the computing device to generate a sound payload based on encoding the configuration profile onto a sound signal. A request is received a request from a voice assistant service for configuring the client device. The request is associated with configuring the client device according to the device policy. The sound payload is transmitted to the voice service for broadcasting from a speaker device. The sound payload is broadcast within an audible distance of the client device.

20 Claims, 4 Drawing Sheets

STAGED USER ENROLLMENT USING AUDIO DEVICES

BACKGROUND

Organizations and enterprises often purchase computing devices for use by their employees. Such computing devices can be preconfigured by the seller. However, further configuration is sometimes desired by the organization or enterprise or by individual members of the organization or enterprise using the computing device. For example, organizations or enterprises may wish to install management applications to regulate the data accessible on purchased computing devices or the applications installed on the purchased computing devices.

Management applications can often begin managing a purchased computing device as soon as they are installed. For example, the management application may begin attempting to install applications or limit access to files for the user that installed the management application. However, in some cases, the installation of a management application can require an information technology (IT) worker to manually install and configure its settings under an administrator account, which can be time-consuming for a batch of devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure includes examples related to staging managed devices with a sound signal. A user, such as an administrative user or an information technology (IT) support worker, can install a management component on a device and select a set of policies to be enforced on the device. For instance, policies enforced by the management component can control use of the device, installation of applications on the device, or content accessible on or by the device, as well as other functionality of the device. An organization or enterprise can regulate which policies to enforce for a device based on the end user's occupational role and/or the end user's association with an organizational group within the organization or enterprise.

To install a management component, an administrative user can login to the device using a staging profile. In the context of the present disclosure, a device can be a mobile phone, a laptop, a tablet, a personal computer, a wearable device, a speaker device, and other computing devices. The staging profile can be a profile configured not to cause user specific policies to be enforced on the device. In some examples, a later user will logon to the device and a management system can associate the corresponding user profile with the device and can cause any policies linked to the user profile of the later user to be applied to the device and enforced by the management component installed on the device. With this approach, the administrator has to manually enroll and configure the management component of every device with the management system. The enrollment process can vary for different operating systems executed on the devices and/or for different device manufacturers. Accordingly, enrolling multiple devices to be managed by the management system can be time-consuming.

The present disclosure includes various examples related to enrolling multiple devices concurrently with a sound wave signal. For example, an administrator user can position multiple devices within an audible range of a speaker device, such as a smart speaker, a voice assistant device, or other suitable speaker devices. The devices can be configured to operate in a sound enrollment mode, which can prepare the devices to receive the sound wave. The speaker device can broadcast the sound wave for the devices. The sound wave can have embedded data that the device can use to automate an enrollment process with a management system. In some examples, voice assistant devices can be used to initiate and control a playback of the sound wave.

Figure 1:
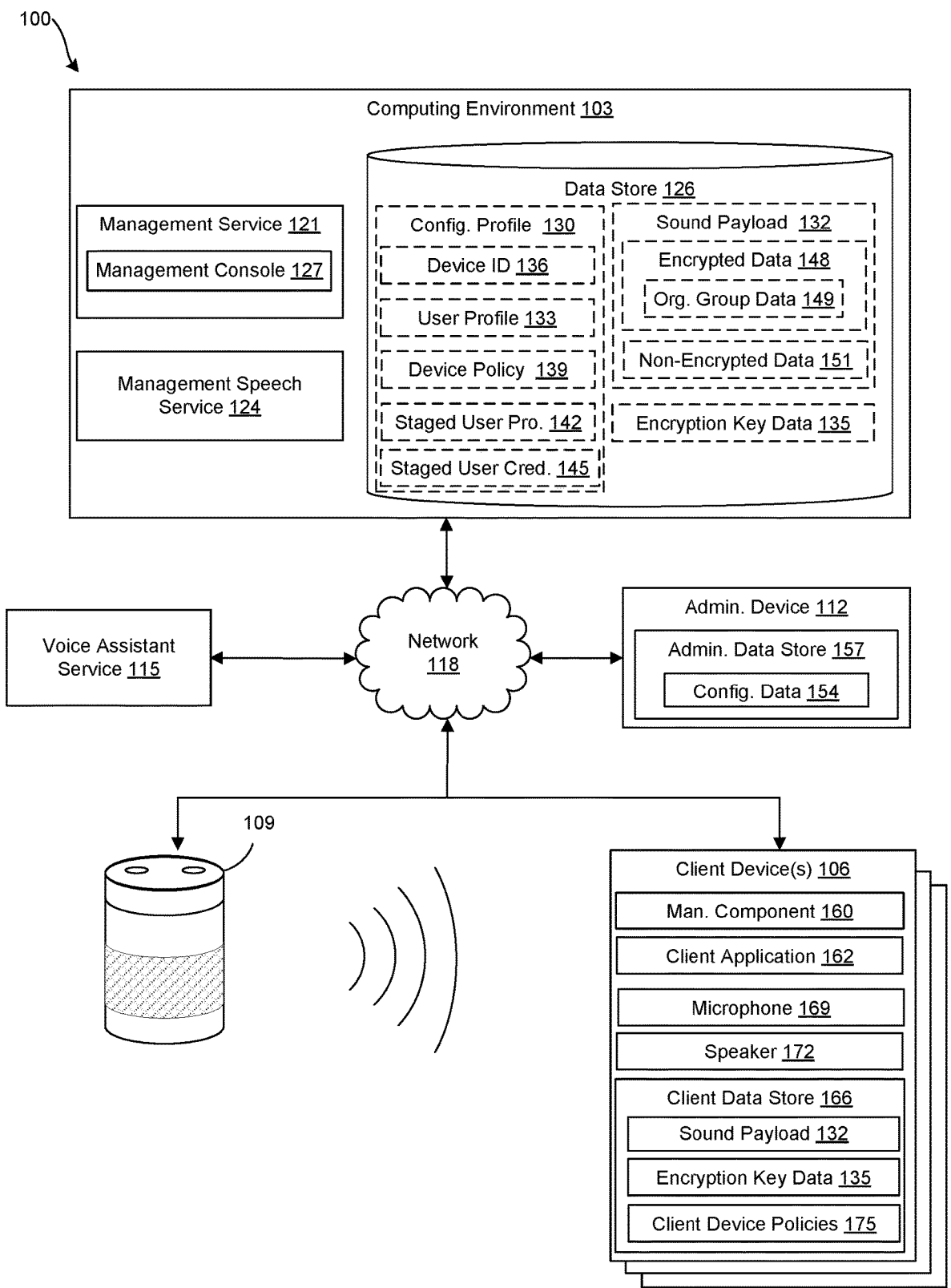
FIG. 1 is a schematic block diagram depicting an example of a network environment according to examples of the disclosure.

Beginning with FIG. 1, shown is an example of a networked environment 100. The networked environment 100 includes a computing environment 103, a client device 106, a voice assistant device 109, an administrative device 112, and a voice assistance service 115, which are in data communication with each other across a network 118. The network 118 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 118 can also include a combination of two or more networks 118. Examples of networks 118 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

The components executed on the computing environment 103 can include a management service 121, a management speech service 124, and other applications, services, processes, systems, engines, or functionality not discussed in detail herein. The management service 121 is executed in the computing environment 103 to monitor and manage the operation of one or more client devices 106. The management service 121 can regulate data accesses locally on the client device 106 and access to networked resources associated with the computing environment. Additionally, the management service 121 can regulate the use of device resources and the application functionality executed on the client device.

The management speech service 124 can be executed to manage enterprise data and voice driven-applications. The management speech service 124 can interface with a voice assistant service 115. The computing environment 103 also includes a data store 126. The data stored in the data store 126 can include one or more configuration profiles 130, one or more sound payloads 132, encryption key data 135, and potentially other data.

In some examples, the management service 121 can include a management console 127, which facilitates the management of client devices 106 by administrators. For instance, the management console 127 generates user interfaces that are rendered on a display device to facilitate administrators operating and interacting with the management service 121. Such user interfaces facilitate an administrator inputting commands or other information for the management service 121. The commands can include specifying a configuration profile 130 for one or more client devices 106 to be managed by the management service 121. The commands can include specifying one or more user profiles 133 for one or more client devices 106. The information can include data, applications, or application functionality that is to be accessible or inaccessible for a specified user profile 133. The user interfaces also include, for example, presentations of statistics or other information regarding the client devices 106 that are managed by the management service 121.

Configuration profiles 130 can represent data specified by an administrator for configuring one or more client devices 106 to be managed by the management service 121. In one example, a configuration profile 130 can include a device identifier 136 associated with a particular client device 106, a user profile 133 that corresponds to an end-user, a device policy 139, a staged user profile 142, staged user credentials 145, and other suitable configuration data for enrolling a device to be managed.

User profiles 133 can represent network user accounts which a user can use to login to the client device 106 and/or the management service 121. Each user profile 133 can have a unique user identifier among other end-users associated with the management service 121. The device identifier 136 can represent a unique device identifier among other client devices 106 being managed by the management service 121. In other examples, the device identifier 136 can represent a device serial number or other suitable device identifiers. The configuration profile 130 can include mapping data that maps device identifiers 136 to a user profile 133.

A device policy 139 can specify how a client device 106 associated with the device policy 139 is to be managed. The device policy 139 can also represent a collection of settings for a particular client device 106 related to accessible and inaccessible device resources, data, application functionality, and other suitable access controls. For instance, a device policy 139 can specify which resources the management service 121 is permitted to provide to a client device 106. As an example, a device policy 139 can specify whether the management service 121 is to provide an email service or a calendar service to a client device 106. In other instances, the device policy 139 can specify which features of an email service are accessible to the client device 106. In other examples, the device policy 139 can specific which device resources the client device 106 can access. For instance, the device policy 139 can prohibit the use of a camera, a microphone, or wireless communication transceivers on the client device 106. In other implementations, the device policy 139 can restrict the access to data or functionality of a third-party application.

In some examples, a device policy 139 can be assigned to a particular client device 106 intended for an end-user. The assigned device policy 139 can be based on the end-user being associated with a particular organizational group. For example, a particular organizational group can have certain security concerns within an enterprise. For instance, employees with access to confidential data can have a particular device policy 139 enforced on their client device 106 in order to address security concerns. The staged user profile 142 can represent a user account of an administrator or an information technology (IT) worker that is configuring client devices 106. The staged user credential 145 can represent a password, an authentication token, and other suitable authentication credentials.

The sound payload 132 can represent configuration profile 130 data embedded into a sound wave. The sound payload 132 can be perceivable or unperceivable by humans. Upon receiving the sound wave, the client device 106 can extract the configuration profile 130 data from the sound wave and process the configuration profile 130 data in order to enroll or configure the client device 106 to be managed by the management service 121. In some examples, the sound payload 132 can include encrypted data 148 and non-encrypted data 151. The encrypted data 148 of the sound payload 132 can include the staged user profile 142 and the staged user credentials 145 of an administrator user. The encrypted data 148 can also include organizational group data 149, such as an organizational group identifier and other organizational group data.

The organizational group data 149 can refer to different organizational groups within an enterprise or an entity. Each organizational group can have a group of client devices 106 managed by the management service 121. In some examples, at least some of the organizational groups can correspond to an enterprise's internal hierarchy or business structure. For example, an enterprise can have an engineering team, an accounting team, and a marketing team. A first organizational group can include members of the engineering team. A second organizational group can include members of the accounting team, and a third organizational group can include members of the marketing team. Each organizational group can have a different device policy 139 for its members based on the organizational group's role within enterprise and security concerns.

The non-encrypted data 151 can include a uniform resource location (URL) for the management service 121 or other configuration data for enrolling a device to be managed. The encryption key data 135 can relate to public key and private key pairs for encrypting and decrypting data embedded into the sound payload 132. The key pairs can represent an asymmetric cryptographic key pair that can include a public encryption key and a corresponding private encryption key. For example, the key pairs can correspond to a key pair for the Rivest, Shamir and Adleman (RSA) algorithm, the Elgamal encryption algorithm, or various elliptic curve cryptographic (ECC) algorithms. The key pairs can be used to secure transfer of the configuration profile 130 data through the sound payload 132.

In some examples, the key pair can be generated and used for secure transfer of encrypted data 148 for different sound payloads 132. In other examples, a different key pair can be generated for each sound payload 132. This approach ensures that if a key pair is stolen or otherwise compromised, subsequent sound payloads 132 will not be at risk. The organizational group data 149 can be used to indicate a particular organizational group associated with the end user of the client device 106. An enterprise may determine that the client devices 106 associated with the particular organizational group can call for the enforcement of a certain device policy 139.

The administrative device 112 can represent one or more administrative devices 112 in data communication with other devices in the networked environment 100. The administrative device 112 can be operated by an administrative user that transmits configuration data 154 to the computing environment 103. The administrative device 112 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The administrative device 112 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the administrative device 112 or can be connected to the administrative device 112 through a wired or wireless connection. The administrative device 112 can include an administrative data store 157, which stores the configuration data 154. The configuration data 154 can represent data for configuring one or more client devices 106 though a sound wave. The configuration data 154 can be embedded into a sound wave by the management service 121 and/or the management speech service 124. In some examples, an administrative device 112 can render a user interface of the management console 127 for an administrative user. The user interface can allow the administrative user to enter configuration data 154 manually or automatically from the administrative data store 157.

The client device 106 is representative of a plurality of client devices 106 that can be coupled to the network 118. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such a management component 160 and a client application 162. The client device 106 can also include a client data store 166, a microphone 169, and a speaker 172. The client application 162 can cause a user interface to be rendered on a display. The client data store 166 can store the sound payload data 132, encryption key data 135, and client device policies 175. The client device policies 175 can represent one or more device policies 139 that have been received from sound payloads 132.

The management component 160 can be executed in the client device 106, for example, to monitor and manage data, software components, and hardware components with respect to the client device 106. The management component 160 can communicate with the management service 121 to facilitate the management service 121 in monitoring and managing the client device 106. For example, the management component 160 transmits data that indicates the status of properties and settings for the client device 106, as well as one or more client device policies 175 currently applied to the client device 106 or the current user of the client device 106. The management component 160 can apply and/or enforce one or more client device policies 175. In one example, the management component 160 functions as a device management service that operates as a portion of an operating system for the client device 106. In another example, the management component 160 functions as a device management agent that operates in the application layer of the client device 106. The management component 160, in other examples, can include an application wrapper that interfaces with a software component to facilitate overseeing, monitoring, and managing resources for the client device 106. In alternative examples, the management component 160 includes a portion of an application that was developed, for example, using a Software Development Kit (SDK) so that the monitoring and management functionality is provided using the application.

The client application 162 can represent various applications and software programs executed on the client device 106, such as a web browser, and an operating system. In one non-limiting example, the client application 162 facilitates user authentication with the voice assistant service 115 so that a user can create an association between a voice assistant device 109, such as a smart speaker. To this end, the microphone 169, the speaker 172 and other suitable device resources can facilitate communication with a voice assistant device 109.

The voice assistant device 109 can represent one or more devices equipped with a speaker 172 and a microphone 169. The voice assistant device 109 allows for audio playback to provide a voice assistant experience. A voice assistant experience can represent an experience in which a user can provide spoken commands or requests that are captured by the one or more microphones 169 integrated with or in communication with the voice assistant device 109. The voice assistant device 109 can playback audio using the speaker 172 in response to the spoken commands or requests. For example, an administrative user can ask the voice assistant device 109 to invoke the management speech service 124 for initiating an enrollment process for one or more client devices 106. In another example, an administrative user can ask the voice assistant device 109 to initiate the management speech service 124 for enabling access to restrictive applications and secure data stored in the data store 126 of an enterprise.

In some embodiments, the voice assistant device 109 can include a display for rendering user interfaces and video. In these scenarios, the voice assistant device 109 can render a video file that broadcasts the sound payload 132 during playback of the video file.

The voice assistant service 115 can communicate with the voice assistant device 109 to process voice commands and facilitate retrieval of information for playback through the voice assistant device 109. The voice assistant service 115 can perform voice recognition or speech-to-text conversion on audio captured by the voice assistant device 109, identify a command or action to perform in response to the captured audio, and response to the voice assistant device 109 audio that should be played back through the voice assistant device 109. The voice assistant service 115 can also provide an API so that third parties can create applications or extend the capabilities of the voice assistant device 109. These applications or capabilities can be implemented within a cloud-based voice assistant service 115 so that the functionality does not need to be implemented within every voice assistant device 109 that is deployed in order for extended capabilities to be available to every user.

Next, a general description of the operation of the various components of the networked environment 100 is provided. To begin, an administrative user can use their administrative device 112 to login into the management console 127. The administrative user can provide their staged user profile 142 and staged user credentials 145 in order to login into the management console 127. The administrative device 112 can render user interfaces for the management console 127 in order to enable the administrative user to specify a configuration profile 130 by manually selecting profile settings or by uploading configuration data 154 from the administrative device 112. The configuration profile 130 can be used for authorizing a sound payload 132 to be generated for one or more client devices 106. The configuration profile 130 can store data such as the staged user profile 142 and the staged user credentials 145. The configuration profile 130 can also store the device identifiers 136 of the client devices 106 that are going to be managed by the management service 121. The configuration profile 130 can include a mapping of the device identifiers 136 to user profiles 133 of the end-users. For example, a batch of ten mobile phones can be purchased in bulk, where each mobile phone has a unique device identifier 136. Each mobile phone can be intended for an end-user with a unique user profile 133. The configuration profile 130 can also include organizational group data 149, such as an organizational group identifier, for an organizational group associated with the end-user. The organizational group identifier can be associated with a particular device policy 139. The management service 121 can monitor the enforcement of the particular device policy 139 on the client devices 106 associated with a particular organizational group.

The sound payload 132 can be generated based on the configuration profile 130. The sound payload 132 can be generated by embedding the configuration profile 130 onto a sound wave using steganography. Steganography can refer to various techniques for concealing data within a sound wave file or a video file. For example, audio steganography techniques can include low-bit encoding, phase coding, spread spectrum, echo data hiding, and other suit techniques for concealing data within in an audio or video file.

The sound payload 132 can be generated to include encrypted data 148 and non-encrypted data 151. For example, the organizational group data 149, the staged user profile 142, and the staged user credentials 145 can be encrypted. In this example, the non-encrypted data 151 can include a server identifier for the management service 121, such as an internet address, a uniform resource locator (URL) address, or other suitable methods for identifying the management service 121 on the network 118.

Additionally, the management component 160 can be installed on the client devices 106, and the management component 160 can be configured in a sound mode in preparation for receiving the sound payload 132. While in sound mode, the client devices 106 can be positioned with in a range of the voice assistance device 109 such that the client device 106 can audibly detect and record the sound payload 132.

An administrative user can then engage a voice assistant device 109 to begin playback of the sound payload 132. Initially, the administrative user can use the voice assistant device 109 to login into the management speech service 124. For example, the administrative user can verbally provide their staged user profile 142 and staged user credentials 145 in order to authenticate a session with the management speech service 124 through the voice assistance service 115. In other examples, the administrative device 112 can be in data communication with the voice assistance device 109 after a wireless pairing process has been completed. The administrative user can then link an authenticated session associated with the staged user profile 142 to the voice assistant device 109.

The administrative user can use the voice assistant service 115 to invoke functions and/or features associated with the management speech service 124 through one or more keywords spoken by the administrative user. For example, the administrative user can speak "Assistant, open management workspace." The keywords "management workspace," or any other keyword, can be associated with the management speech service 124. Then, the administrative user can invoke particular functions and/or features of the management speech service 124. For example, the administrative user can speak "Assistant, enroll devices to organizational group alpha beta." The keywords "enroll device," or any other keywords, can be associated with initialing an execution of an enrollment process of one or more client devices 106 with use of a sound payload 132. The keywords "organizational group alpha beta," or any other keywords can be used to identify the sound payload 132 associated with organizational group "alpha beta." These commands and parameters can be transmitted to the management speech service 124.

In response, the management speech service 124 can transmit the sound payload 132 to the voice assistant service 115, which is in turn transmitted to the voice assistant device 109. The voice assistant device 109 can broadcast the sound payload 132 to the client devices 106 in the vicinity. The client devices 106 can detect and record the sound payload 132 and extract data related to setting up the client device 106 to be managed by the management service 121. Through the extraction process, the client device 106 can obtain a client device policy 175, which can be used to enforce restrictions related to device resources, application functionality, data access, and other suitable restrictions on the client device 106. The enforcement of the restrictions can be monitored and managed by the management service 121. To this end, the multiple client devices 106 can be set up to abide by restrictions associated with the client device policy 175 concurrently. In some examples, an advanced mode of the process can involve the sound payload 132 including a specific user profile 133 and a unique device identifier 136 for a specific end-user. As a result, the client device 106 can be automatically enrolled with the management service 121 for the specific user profile 133, which is for an end user instead of a staged user profile 142 associated with an administrative user.

Figure 2:
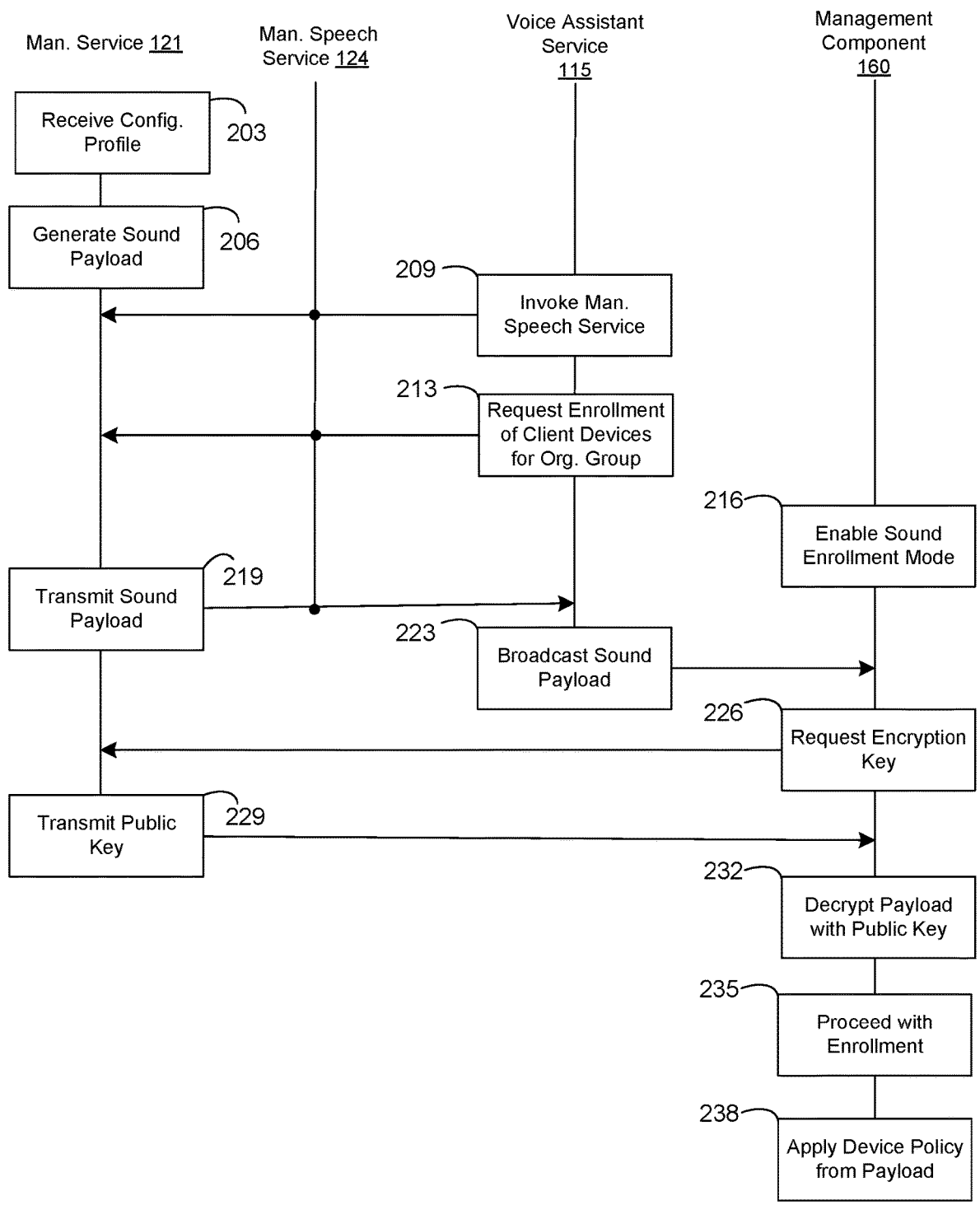
FIG. 2 is an example sequence diagram illustrating functionality implemented by components of the networked environment in FIG. 1.

Referring next to FIG. 2, shown is an example of a sequence diagram illustrating functionality implemented by components of the networked environment 100 in FIG. 1. Beginning at step 203, the management service 121 can receive a configuration profile 130 from an administrative device 112 or any other device. The configuration profile 130 can include data related to the enrollment and/or configuration of one or more client devices 106 with the management service 121.

At step 206, the management service 121 can generate the sound payload 132 based on the configuration profile 130. In some examples, the management service 121 can encrypt a first portion of the configuration profile 130 data and omit encrypting a second portion of the configuration profile 130 data.

At step 209, it is assumed the voice assistant service 115 can receive commands and provide responses through the voice assistant device 109. The administrative user can invoke the voice assistant service 115 by uttering particular keywords associated with the voice assistant service 115 to the voice assistant device 109, such as a smart speaker. Through a session with the voice assistant service 115, the administrative user can provide additional commands to the voice assistance service 115 in order to invoke the management speech service 124. In some examples, the management speech service 124 can be viewed as a voice-driven application or skill executed through the voice assistant service 115.

At step 213, the administrative user can utter a verbal command to enroll client devices 106 to an organizational group. For example, the verbal command spoken by the administrative user can include "Assistant, enroll client device to organizational group alpha beta." The expression "enroll client device" can represent predefined keywords associated with a command. The expression "organizational group alpha beta" can represent data that can be used to identify a particular sound payload 132 associated with the "alpha beta" organizational group. The request data can be transmitted to the management service 121.

At step 216, it can be assumed the management component 160 has been installed on the client device 106. The administrative user can set the management component 160 in sound enrollment mode in preparation for recording a sound payload 132. At step 219, the management service 121 can transmit the sound payload 132 to the voice assistance service 115. At step 223, the voice assistant service 115 can broadcast the sound payload 132 to the client device 106 within an audible distance through the voice assistant device 109. In some examples, the voice assistant device 109 has a display. The sound payload 132 can be broadcast during the playback of a video on the display of the voice assistant device 109.

At step 226, the management component 160 can extract data from the sound payload 132. From the extracted data, the management component 160 can identify a server URL associated with the management service 121. In this non-limiting example, it assumed the sound payload 132 includes encrypted data 148, which was encrypted with a private key by the management service 121. At this stage, the management component 160 may not be able to access the encrypted data 148. The management component 160 can transmit a request to the management service 121 using the extracted URL from the sound payload 132.

At step 229, the management service 121 can transmit a public key over the network 118 to the management component 160. At step 232, the management component 160 can decrypt the encrypted data 148 using the public key received from the management service 121. From decrypting the encrypted data 148, the management component 160 can access data such as a device policy 139, a staged user profile 142, a staged user credential 145, and other suitable configuration profile 130 data.

At step 235, the management component 160 can use the data accessed from the extracted data 148 to proceed with the enrollment of the client device 106 with the management service 121. At step 238, the management component 160 can enforce a client device policy 175 to the operations of the client device 106. The client device policy 175 can represent one or more device policies 139 that have been received from the management service 121.

Figure 3:
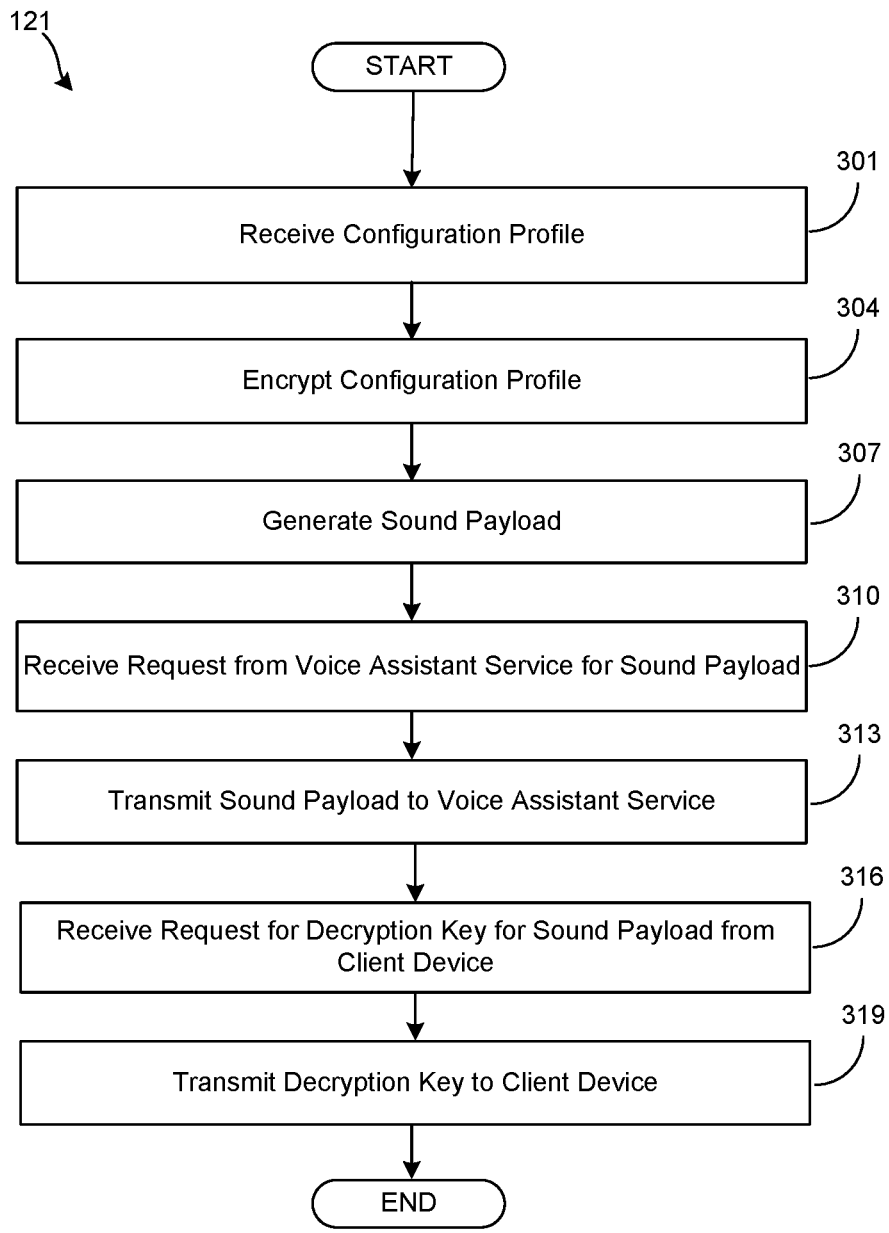
FIG. 3 is a flow chart depicting the operation of an example of a component of the network environment of FIG. 1.

Moving on to FIG. 3, shown is a flowchart depicting an example of the operation of a portion of the management service 121. It is understood that the flowchart of FIG. 3 provides merely an example of the many different types of functional arrangements that can be employed to implement the portion of the management service 121 as described herein. As an alternative, the flowchart of FIG. 3 can be viewed as depicting an example of elements of a method implemented by the management service 121 in some implementations. Further, in some implementations, a portion or all of aspects of FIG. 3 can be performed by the management speech service 124.

Beginning with step 301, the management service 121 can receive a configuration profile 130 from an administrative user. The administrative user can use user interfaces for a management console 127 to manually specify configuration settings for a batch of one or more client devices 106. In other cases, the administrative device 112 can transmit configuration data 154 stored in a file to the management service 121. Whether manually entered or uploaded, the configuration data 154 can be stored as a configuration profile 130 in the data store 126.

At step 304, the management service 121 can encrypt portions of the configuration profile 130, such as organizational group data 149, a staged user profile 142, a staged user credential 145, and other suitable data associated with the sound payload 132. In some examples, a unique public-private key pair can be generated for a particular sound payload 132, which can be stored as encryption key data 135. Portions of the configuration profile 130 can be encrypted with a private key. Additionally, a portion of the configuration profile 130 can be omitted from encryption, such as a server identifier or an internet protocol address of a server.

At step 307, the management service 121 can generate the sound payload 132 by embedding the configuration profile 130 data in a sound wave signal. In some examples, the configuration profile 130 can be embedded as encrypted data 148 and non-encrypted data 151 onto the sound wave signal. In some implementations, the embedded configuration profile 130 data can be imperceptible to humans during playback of the sound payload 132. In other implementations, the sound payload 132 can include a perceptible sound to indicate to humans that the playback of the sound payload 132 has begun, in progress, has been completed, or some other suitable progress indicator. In another example, the sound payload 132 can be embedded in a video file.

At step 310, the management service 121 can receive a request for the sound payload 132 from the voice assistant service 115. In other example scenarios, the request can be received from the voice assistant service 115 by way of the management speech service 124. The request can include the organizational group data 149, such as an organizational group identifier. The organizational group data 149 can be associated with a particular client device 106. Further, a particular sound payload 132 can be used based on the organizational group data 149.

At step 313, the management service 121 can transmit the sound payload 132 to the voice assistant service 115. In some examples, the sound payload 132 can be transmitted by way of the management speech service 124. Upon receiving the sound payload 132, the voice assistant service 115 can transmit the sound payload to the voice assistant device 109 for broadcast. After being broadcast to nearby client devices 106, the client devices 106 can record the sound payload 132 and extract data from the sound payload 132. In some examples, the client device 106 can extract a URL server associated with management service 121 from non-encrypted data 151 in the sound payload 132. In some scenarios, the voice assistant device 109, the voice assistant service 115, and/or the management service 121 can receive a request from a client device 106 to replay the sound payload 132 in the event that the client device 106 was not able to detect or record the sound payload 132.

At step 316, the management service 121 can receive a request for a decryption key from the client device 106. In some examples, the request can include organizational group data 149, such as an organizational group identifier. At step 319, the management service 121 can transmit the decryption key to the client device 106. In some examples, the management service 121 can transmit a public key to the client device 106. The client device 106 can use the decryption key to decrypt the encrypted data 148. The client device 106 can extract data from encrypted data 148 of the sound payload 132, which can include the device policy 139, the staged user profile 142, the staged user credential 145, the user profile 133, the device identifier 136, and other suitable managed device data. The client device 106 can use the extracted data to finish configuring that the device to be managed by the management service 121 according to a device policy 139. Then, the management service 121 proceeds to the end.

Figure 4:
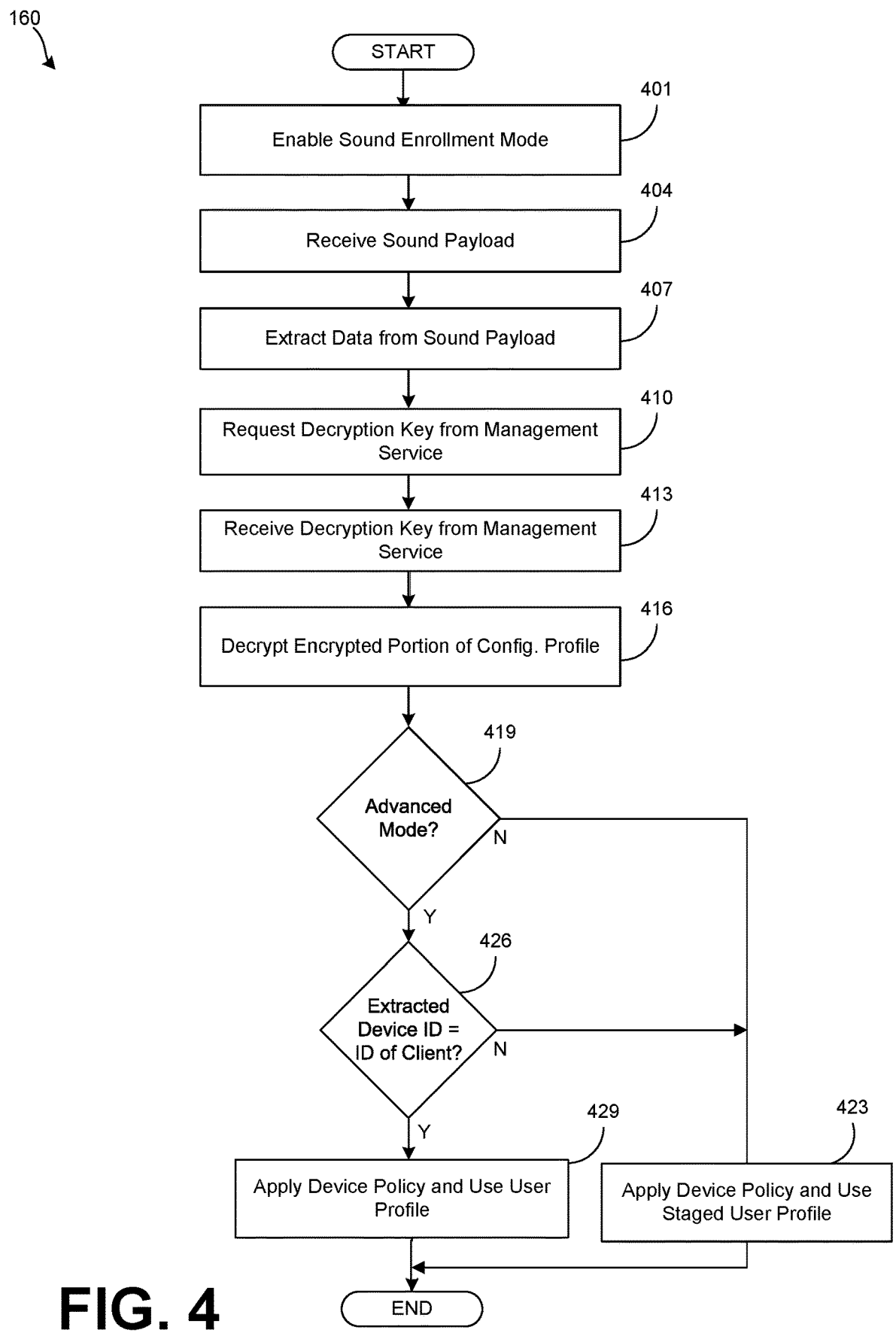
FIG. 4 is a flow chart depicting the operation of an example of a component of the network environment of FIG. 1.

Moving on to FIG. 4, shown is a flowchart depicting an example of the operation of a portion of the management component 160. It is understood that the flowchart of FIG. 4 provides merely an example of the many different types of functional arrangements that can be employed to implement the portion of the management component 160 as described herein. As an alternative, the flowchart of FIG. 4 can be viewed as depicting an example of elements of a method implemented by the management component 160 in some implementations. Further, in some implementations, a portion or all of aspects of FIG. 4 can be performed by other applications executed in the client device 106.

Beginning with box 401, the management component 160 can configure the client device 106 to operate in a sound enrollment mode. The client device 106 can be placed in the sound enrollment mode through different processes. In some examples, the management component 160 can render user interfaces that allow a user to select a user interface component that places the client device 106 in the sound enrollment mode. In other examples, the management component 160 can receive a verbal command from the voice assistant device 109. For example, the voice assistant device 109 can utter the keywords, "Ok Client Device, open enterprise workspace app in sound enrollment mode," or any other keywords, that can cause the management component 160 to place the client device 106 in the sound enrollment mode.

In some examples, after the voice assistant device 109 has commanded the client device 106 to transition to the sound enrollment mode, the voice assistant device 109 can wait a predefined period of time before broadcasting the sound payload 132. For example, after issuing the command to transmit to the sound enrollment mode, the voice assistant device 109 can wait five seconds initiating playback of the sound payload 132. In some examples, the client device 106 can transmit an acknowledgement to the voice assistant device 109, the voice assistant service 115, the management speech service 124, or the management service 121 to initiate the playback of the sound payload 132 or to acknowledge receipt of the sound payload 132.

At step 404, the management component 160 can receive the sound payload 132 and store it into the client data store 166. The client device 106 can detect and record the sound payload 132 using its microphone 169. In some examples, the playback of the sound payload 132 can include a human-perceptible portion such as "Ok client device, playback of the sound payload has begun." During or after the playback of the human-perceptible portion, an imperceptible portion can be played, in which the encrypted data 148 and/or the non-encrypted data 151 is transmitted.

At step 407, the management component 160 can extract data from the sound payload 132. In some examples, the sound payload 132 can include an encrypted data portion 148 and a non-encrypted data portion 151. In these examples, the non-encrypted data portion 151 can include a server address for requesting a decryption key in order to access the contents of the encrypted data portion 148.

At step 410, the management component 160 can transmit a request for a decryption key to the management service 121 or the management speech service 124. The request can be transmitted to the server address extracted from the non-encrypted data 151. In some embodiments, the sound payload 132 may not have encrypted data 148, and as a result, transmitting a request for a decryption key can be omitted.

At step 413, the management component 160 can receive a decryption key from the management service 121, which can be stored as encryption key data 135. In some examples, the decryption key can be relayed to the client device 106 by way of a data connection between the voice assistant device 109 and the client device 106. In some implementations, the decryption key transmitted is a public key that corresponds to the private key used to encrypt the encrypted data 148 for the sound payload 132.

At step 416, the management component 160 can decrypt the encrypted data 148 using the decryption key. The client device 106 can then access the staged user profile 142, the staged user credential 145, the device policy 139, the user profile 133, the device identifier 136, and/or other configuration profile data 130 in order for the client device 106 to be managed by the management service 121.

At step 419, the management component 160 can determine whether the sound payload 132 has an advanced mode indicator. If not, the management component 160 proceeds to step 423. At step 423, the management component 160 can use the staged user profile 142 for the remainder of the configuration and/or enrollment process in order for the client device 106 to be managed by the management service 121. The client device 106 can be enrolled to be managed by the management service 121 using the staged user profile 142 and the staged user credentials 145. Then, the management component 160 proceeds to the end. If the sound payload 132 does not have an advance mode indicator, then the management component 160 proceeds to step 426.

At step 426, the management component 160 can extract a first device identifier 136 from the sound payload 132. In some examples, the first device identifier 136 can be accessed from the encrypted data 148 of the sound payload 132. The first device identifier 136 can represent the serial number of a manufacturer, a unique identifier among devices managed by the management service 121, or some other unique identifier. Then, the management component 160 can then determine whether the first device identifier 136 extracted from the sound payload 132 matches a second device identifier 136 stored in the client device 106. If not, the management component 160 proceeds to the step 423. If yes, the management component 160 proceeds to step 429.

In some examples, the voice assistant device 109 can broadcast multiple sound payloads 132 during a playback session. Each sound payload 132 can have a different device identifier 136 and a different corresponding user profile 133. Thus, during the playback session, each sound payload 132 can be used to configure a different client device 106. Accordingly, each client device 106 can be configured to a unique user profile 133.

At step 429, the management component 160 can use the user profile 133 to proceed with the remainder of the enrollment. The sound payload 132 can include a mapping that indicates that the first device identifier 136 corresponds to a particular user profile 133. The particular user profile 133 can correspond to a specific end-user. Thus, the management component 160 can proceed with configuring and/or enrolling the client device 106 with the management service 121 using the user profile 133, which can include a specific user identifier. The management component 160 can begin enforcing the client device policy 175 for the operations of the client device 106. Then, the management service 121 proceeds to the end.

The flowcharts and sequence diagrams of FIGS. 2-4 show examples of the functionality and operation of implementations of components described herein. The components described herein can include hardware, software, or a combination of hardware and software. If embodied in software, each element can represent a module of the code or a portion of the code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams and flowcharts of FIGS. 2-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein, such as at least the computing environment 103, the client device 106, the administrative device 112, the voice assistant device 109, and the voice assistant service 115, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or more processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions on an application of one or more data signals, application specific integrated circuits (ASICs) having appropriate logic gates, programmable logic devices (e.g., field-programmable gate arrays (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In this case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

It is emphasized that the above-described examples of the present disclosure are merely examples of implementations to set forth a clear understanding of the principles of the disclosure. Many variations and modifications can be made to the above-described examples without departing substantially from the spirit and principles of the disclosure. All modifications and variations are intended to be included herein within the scope of this disclosure.

The invention claimed is:

1. A system, comprising:
   at least one computing device; and
   program instructions executable in the at least one computing device that, when executed by the at least one computing device, cause the at least one computing device to:
   receive a configuration profile for configuring a client device, the configuration profile comprising a device policy associated with an organizational group identifier;
   generate a sound payload based on embedding the configuration profile into a sound signal;
   receive a request from a voice assistant service for configuring the client device according to the device policy, the request comprising the organizational group identifier;
   select the sound payload for initiating an enrollment process with a management service based on the request comprising the organizational group identifier; and
   transmit the sound payload to the voice assistant service for broadcasting from a speaker device, wherein the sound payload is broadcast to the client device, and the broadcast of the sound payload initiates the enrollment process for the management service to manage the client device based on the device policy.

2. The system of claim 1, wherein the sound payload comprises an encrypted portion and a non-encrypted portion, wherein the non-encrypted portion comprises a uniform resource locator (URL) associated with the at least one computing device.

3. The system of claim 2, further comprising program instructions executable in the at least one computing device that, when executed, further cause the at least one computing device to:
   generate the encrypted portion of the configuration profile, wherein the encrypted portion comprises at least one of a staging user identifier and a staging user credential.

4. The system of claim 2, further comprising program instructions executable in the at least one computing device that, when executed, further cause the at least one computing device to:
   receive a device request from the client device by way of the URL; and
   transmit an encryption key to the client device for decrypting the encrypted portion of the configuration profile from the sound payload.

5. The system of claim 1, wherein the device policy imposes an operational restriction on the client device.

6. The system of claim 1, wherein the configuration profile comprises a first device identifier and a user identifier.

7. The system of claim 1, wherein the sound payload is generated using a steganography process, and the sound payload comprises a human-imperceptible portion and a human-perceptible portion.

8. A non-transitory computer-readable medium embodying program instructions executable in at least one computing device that, when executed by the at least one computing device, cause the at least one computing device to:
   receive a configuration profile for configuring a client device, the configuration profile comprising a device policy associated with an organizational group identifier;
   generate a sound payload based on embedding the configuration profile into a sound signal;
   receive a request from a voice assistant service for configuring the client device according to the device policy, the request comprising the organizational group identifier;
   select the sound payload for initiating an enrollment process with a management service based on the request comprising the organizational group identifier; and
   transmit the sound payload to the voice assistant service for broadcasting from a speaker device, wherein the sound payload is broadcast to the client device, and the broadcast of the sound payload initiates the enrollment process for the management service to manage the client device based on the device policy.

9. The non-transitory computer-readable medium of claim 8, wherein the sound payload comprises an encrypted portion and a non-encrypted portion, wherein the non-encrypted portion comprises a uniform resource locator (URL) associated with the at least one computing device.

10. The non-transitory computer-readable medium of claim 9, wherein the program instructions, when executed, further cause the at least one computing device to:
    generate the encrypted portion of the configuration profile, wherein the encrypted portion comprises at least one of a staging user identifier and a staging user credential.

11. The non-transitory computer-readable medium of claim 9, wherein the program instructions, when executed, further cause the at least one computing device to:
    receive a device request from the client device by way of the URL; and transmit an encryption key to the client device for decrypting the encrypted portion of the configuration profile.

12. The non-transitory computer-readable medium of claim 8, wherein the device policy imposes an operational restriction on the client device.

13. The non-transitory computer-readable medium of claim 8, wherein the configuration profile comprises a first device identifier and a user identifier.

14. The non-transitory computer-readable medium of claim 8, wherein the sound payload is generated using a steganography process, and the sound payload comprises a human-imperceptible portion and a human-perceptible portion.

15. A computer-implemented method, comprising:
    receiving, by at least one computing device, a configuration profile for configuring a client device, the configuration profile comprising a device policy associated with an organizational group identifier;
    generating, by the at least one computing device, a sound payload based on embedding the configuration profile into a sound signal;
    receiving, by the at least one computing device, a request from a voice assistant service for configuring the client device according to the device policy, the request comprising the organizational group identifier;
    selecting, by the at least one computing device, the sound payload for initiating an enrollment process with a management service based on the request comprising the organizational group identifier; and
    transmitting, by the at least one computing device, the sound payload to the voice assistant service for broadcasting from a speaker device, wherein the sound payload is broadcast to the client device, and the broadcast of the sound payload initiates the enrollment process for the management service to manage the client device based on the device policy.

16. The computer-implemented method of claim 15, wherein the sound payload comprises an encrypted portion and a non-encrypted portion, wherein the non-encrypted portion comprises a uniform resource locator (URL) associated with the at least one computing device.

17. The computer-implemented method of claim 16, further comprising:
    generating, by the at least one computing device, the encrypted portion of the configuration profile, wherein the encrypted portion comprises at least one a staging user identifier and a staging user credential.

18. The computer-implemented method of claim 16, further comprising:
    receiving, by the at least one computing device, a device request from the client device by way of the URL; and
    transmitting, by the at least one computing device, an encryption key to the client device for decrypting the encrypted portion of the configuration profile from the sound payload.

19. The computer-implemented method of claim 15, wherein the device policy imposes an operational restriction on the client device.

20. The computer-implemented method of claim 15, wherein the configuration profile comprises a first device identifier and a user identifier.

\* \* \* \* \*